UNITED STATES PATENT OFFICE.

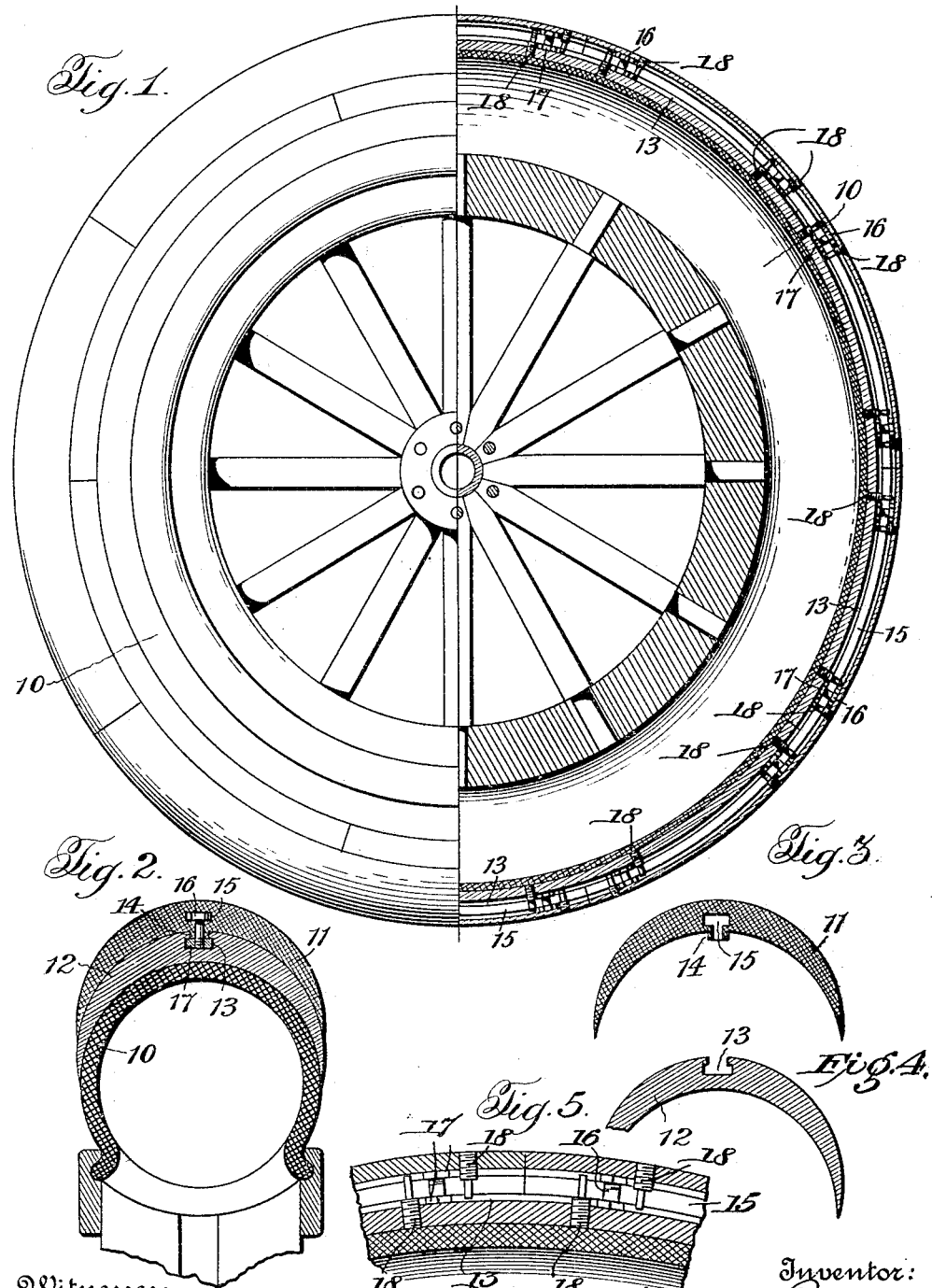

JOSEPH WILLIAM BECK, OF COLLEGE HILL, OHIO, ASSIGNOR OF FORTY-NINE ONE-HUNDREDTHS TO JAMES GARFIELD FISK, OF CINCINNATI, OHIO.

ARMOR FOR TIRES.

1,121,322.  Specification of Letters Patent.  Patented Dec. 15, 1914.

Application filed November 1, 1911. Serial No. 657,959.

*To all whom it may concern:*

Be it known that I, JOSEPH W. BECK, citizen of the United States, residing at College Hill, in the county of Hamilton and State of Ohio, have invented certain new and useful Improvements in Armor for Tires; and I do hereby declare the following to be a full, clear, and exact description of the invention, such as will enable others skilled in the art to which it appertains to make and use the same.

This invention relates to improvements in armor for tires, being more particularly related to armor for the pneumatic tires of vehicles.

It is the main and primary object of the present invention to provide an armor of the class referred to through the medium of which pneumatic tires may be guarded against puncture without, however, destroying their resiliency, thereby eliminating the annoying conditions incident to puncture, but preserving in the tire the absorptive characteristics essential for properly taking up shock and jar, and preventing its transmission to the body of the vehicle.

The invention further aims to provide an improved armor the construction of which is such that only minimum wear shall be exerted on the tires equipped therewith.

Other objects and advantages will appear as the nature of the improvements is better understood, the invention consisting, substantially, in the construction, combination and arrangement of parts hereinafter fully described, illustrated in the accompanying drawings, and particularly pointed out in the appended claims.

In the drawings, wherein is illustrated a preferred embodiment of the invention, Figure 1 is a side elevation, partially in section, of a wheel having a pneumatic tire equipped with an armor constructed in accordance with the hereindescribed invention. Fig. 2 is a transverse sectional view of the tire and armor, the scale being enlarged. Figs. 3 and 4 are views similar to Fig. 2 of the outer and inner bands, respectively, of the armor. Fig. 5 is a detail sectional view, on an enlarged scale, disclosing more clearly the arrangement of the holding bolts and the limiting stops therefor in their relation to the inner and outer band sections.

Referring in detail to the drawings, the numeral 10 designates a pneumatic tire, conventionally illustrated as of the clencher type. This, however, forms no part of the invention, neither is it essential that the tire shall be a pneumatic tire, the invention being useful for application to either cushion or solid tires for the protection and preservation thereof.

Surrounding the tread surface of the tire 10 is the hereindescribed armor, comprising an outer band 11 and an inner band 12, the contiguous surfaces of these bands being formed to fit each other snugly, and thereby preclude lateral play or thrust of the outer band upon the inner one. The bands 11 and 12 are formed of metal, the outer being of steel, and thus adapted to withstand hard usage and wear, while the inner band is aluminum. The weight of the inner band 12 is, therefore, light; it is non-corrosive; it creates little friction in relation to the outer steel band, and the difference in the materials of which the two bands are formed prevents sticking of the same by reason of dust or dirt which may enter therebetween.

For conveniently assembling the bands 11 and 12 upon each other, and also upon a tire, the same are formed of sections, the number of sections into which each is divided being determined by the size of the tire. The sections of each band break joint with those of the other band, thereby causing an overlapping of the various sections, as clearly understood in Fig. 1, and the ends of the respective sections are properly finished, as by rounding of the edges, to avoid cutting or abrading the parts with which they contact. At this point it will be observed that the inner band 12 conforms to the contour of the tire 10, while the inner surface of the outer band 11 also conforms to the contour of the inner band. The outer surface of the band 11, while partaking of the conventional convex shape characteristic of tires, may, however, be flattened, or any other desired shape imparted thereto to obtain the proper traction, such changes being, of course, obvious.

In order to hold the bands 11 and 12 in proper relation to each other, and particularly to prevent lateral movement, the inner band 12 is provided with a circumferential T-shaped groove 13, which groove receives an inwardly-extending annular lug 14 carried by the outer band 11, and formed in the latter, and opening through said annular lug 14, is a T-shaped groove 15. Seated in the grooves 13 and 15 are fastening bolts 16 equipped with nuts 17, these bolts being thus double-headed, and said bolts are distributed around the bands 11 and 12, being arranged preferably adjacent to the ends of the band sections, and thereby maintaining the sections in proper relative position.

It will be noted that the sections of the outer band 11 are of the same length as the sections of the inner band 12. When, therefore, one of the sections of the inner band is assembled upon one of the sections of the outer band, their ends will register.

In applying the hereindescribed armor to a tire, a section of the inner band is first assembled upon a section of the outer band, so that the ends of the sections will register in the manner noted, and in so assembling these two sections the double-headed bolts 16 are introduced into the grooves 13 and 15 endwise thereof and positioned in approximately spaced relation within the grooves. The bolts 16 will thus hold the assembled sections together. As thus assembled, the requisite number to cover a tire of given circumference is brought together upon the tire, the latter being, of course, deflated to the necessary extent, and the ends of each assembled pair of outer and inner sections are brought into abutting relation with the next contiguous sections assembled about the tire. As all of the sections of the outer band are now in alinement, and likewise all of the sections of the inner band are in alinement, circumferential movement of the sections of either the outer or the inner band with respect to the sections of the other band will cause the sections of the respective bands to break joint with the other, and thus position the sections of the two bands in overlapped relation. By reason of the double-headed bolts 16 the bands are now locked in engagement with each other, and displacement of the respective sections is prevented. With the sections assembled in the manner noted suitable stops 18 are introduced into the grooves 13 and 15, through the sections of the inner and outer bands 11 and 12, these stops being arranged so as to be positioned in advance and in rear of the double-headed bolts 16, and thus properly holding the bolts 16 in spaced relation to each other. After all the sections of the band have been brought together on the tire, and joined in associated relation, the tire is inflated to the desired pressure, the armor being held on the tire by the inflated condition of the latter, and with the bolts 16 distributed throughout the band sections, it being remembered that the contiguous parallel sections break joint with each other, the sections of the band 11 are held in locked relation to the sections of the band 12. The armor is, therefore, in position to protect the tire against puncture, but the tire is free to yield under the inequalities of the road, the armor in no wise depriving the tire of its elasticity or preventing it taking up the shock and jar in the usual manner.

The hereindescribed armor being independent in its construction from the construction of the tires with which it may be used, the same is capable of application to any existing tire structure. It may, however, be incorporated in the construction of a tire, and thereby form a part of the latter, and because of the advantages derived from the present invention, canvas, duck, or leather casings may be used as the casings for the rubber inner tubes, the armor affording the proper protection to the casings when so formed.

Having thus described the invention, what is claimed as new, and desired to be secured by Letters Patent, is:

1. An armor of the class described, comprising inner and outer sectional bands fitted upon each other and circumferentially movable whereby to break joint between the respective band sections, and fastening devices interposed between the bands for detachably holding the same in associated relation.

2. An armor of the class described, comprising inner and outer bands formed of sections arranged in superimposed relation, the sections of one band being circumferentially movable in relation to the sections of the other, whereby to break joint between the respective band sections, and fastening devices for detachably holding the bands in associated relation.

3. An armor of the class described, comprising a plurality of bands arranged in superimposed relation and each formed of a plurality of sections, the sections of one of the bands being capable of circumferential movement with respect to the sections of the other band, whereby the sections of one band are caused to break joint with the sections of the other band, the sections of one of the bands having projecting lugs, and the sections of the other band being provided with grooves to receive said lugs, whereby to interengage said sections, and fastening means for holding said bands in associated relation.

4. An armor of the class described, comprising inner and outer bands fitted upon each other and capable of circumferential movement in relation to each other, each of said bands being formed of sections which are caused to break joint with the sections of the other band by said circumferential movement, the sections of the outer band having projecting lugs, the sections of the inner band being provided with grooves for the reception of said lugs, and fastening devices fitted within said lugs and grooves for holding the sections in associated relation.

5. An armor of the class described, comprising inner and outer bands fitted upon each other and each formed of a plurality of sections capable of circumferential movement with respect to the sections of the other band, the sections of the inner band being provided with grooves, and the sections of the outer band being provided with inwardly-extending lugs adapted to be received and fit within the grooves of the inner band sections, said outer band sections being also provided with grooves opening through the lugs thereof, and headed fastening devices mounted in the grooves of the respective band sections and extending through said lugs, whereby to hold the bands in associated relation.

In testimony whereof I affix my signature, in the presence of two witnesses.

JOSEPH WILLIAM BECK.

Witnesses:
WILLIAM HANG,
GUSTAV KNAUSZ.

Copies of this patent may be obtained for five cents each, by addressing the "Commissioner of Patents, Washington, D. C."